United States Patent [19]
Straarup et al.

[11] 4,121,770
[45] Oct. 24, 1978

[54] WEAR-RESISTANT ROTOR WHEEL

[75] Inventors: Orla Straarup, Copenhagen; Max Fowler Petersen, Havndal; Klaus Erik Gude, Vedbaek, all of Denmark

[73] Assignee: A/S Niro Atomizer, Soborg, Denmark

[21] Appl. No.: 761,033

[22] Filed: Jan. 21, 1977

[30] Foreign Application Priority Data

Jan. 26, 1976 [DK] Denmark ................................. 294/76
Dec. 2, 1976 [DK] Denmark ............................. 5434/76

[51] Int. Cl.² ............................................. B05B 3/10
[52] U.S. Cl. ..................................... 239/224; 239/591
[58] Field of Search ..................... 239/224, 223, 591; 233/1 A, 1 E; 159/4 S

[56] References Cited
U.S. PATENT DOCUMENTS

| | | | |
|---|---|---|---|
| 3,454,226 | 7/1969 | Nielsen | 239/224 |
| 3,640,467 | 2/1972 | Moller et al. | 239/224 |
| 3,887,133 | 6/1975 | Straarup et al. | 239/224 |

Primary Examiner—Evon C. Blunk
Assistant Examiner—Michael J. Forman
Attorney, Agent, or Firm—Sughrue, Rothwell, Mion, Zinn and Macpeak

[57] ABSTRACT

A wear-resistant rotor wheel for use as an atomizer wheel for the atomization of slurries of highly abrasive materials or as a rotor wheel in an agigator or pump of the centrifugal type. The cylindrical side wall of the wheel is formed with ejection orifices and defines together with a body of revolution arranged around the wheel hub a bowl-shaped space which is downwardly limited by an annular plate of wear-resistant sintered material covering the wheel bottom. The annular plate is arranged to be spaced from the wheel bottom with its outer circumference sealingly joining the inner side of the side wall, so that solid particles from a slurry are not allowed to enter between the circumference of the plate and the side wall, while the side wall is allowed to follow deflection of the wheel bottom without subjecting the annular plate to deformation forces. The annular plate may be firmly secured either at the side wall, in which case it is connected with the body of revolution and axially displaceable together therewith relative to the hub, or at the hub, in which case a sealing ring is interposed between the annular plate and the side wall so as to allow relative movement therebetween.

7 Claims, 5 Drawing Figures

WEAR-RESISTANT ROTOR WHEEL

The present invention relates to wear-resistant rotor wheels and, in particular, to rotor wheels intended for use as atomizer wheels for the atomization of slurries of highly abrasive materials or as rotor wheels in agitators or pumps of the centrifugal type.

Rotor wheels to be used as atomizer wheels for the atomization of materials such as cement slurry or slurries of clay or ore concentrates are known, inter alia, from U.S. Pat. Nos. 3,454,226, 3,640,467 and 3,887,133. In order to prevent destruction of such a wheel as a result of the wearing action of the solid particles in the slurry against the bottom of the internal bowl-shaped space defined by a body of revolution arranged around the wheel hub, the cylindrical side wall and the bottom of the wheel, it is customary practice to cover the wheel bottom by an annular plate of a wear-resistant sintered material, such as aluminium oxide, tungsten carbide or silicon carbide, so that the upper side of this plate will form the lower wall of said bowl-shaped space and adjoin the outer surface of the body of revolution arranged around the hub.

In prior art atomizer wheels, in which the outer circumference of the annular sintered plate is completely clear of the inner side of the side wall of the wheel, it has appeared that during operation of the wheel, solid particles from the slurry supplied thereto will be able to penetrate into the clearance between the annular plate and the inner side of the side wall. Thereby, the annular plate which is firmly secured to the hub of the wheel will rapidly be clamped between the hub and the side wall. Due to the fact that the wheel bottom during rotation of the wheel will deflect at its outer circumference as a result of the considerable centrifugal forces acting on the side wall of the wheel, the annular plate thus clamped between the hub and the side wall will be subject to such a load that it will show a tendency to crack in radial directions. This tendency is mainly caused by the fact that the sintered material, the purpose of which is to resist wear, even though it is able to withstand great pressure forces, will only withstand rather small tension stresses.

According to the invention, there is provided a wear-resistant rotor wheel, particularly for use as an atomizer wheel for the atomization of slurries of highly abrasive materials or as a rotor wheel for an agitator or pump of the centrifugal type, comprising a central hub, a wheel bottom connected with said hub, a body of revolution arranged around said hub, an annular plate of a wear-resistant sintered material covering said wheel bottom, a substantially cylindrical side wall formed with a number of ejection orifices, a number of wear-resistant bushings individually lining each of said orifices, said body of revolution, said annular plate and the inner side of said side wall defining an annular bowl-shaped spaced concentric with said hub, and inlet means for feeding a slurry into said bowl-shaped space, wherein the improvement comprises the arrangement of said annular plate to be spaced from said wheel bottom with its outer circumference sealingly joining the lower part of the inner side of said side wall in a manner so as to prevent solid particles contained in said slurry from penetrating between said annular plate and said side wall and simultaneously allow said side wall to follow deflection of said wheel bottom without subjecting said annular plate to deformation forces.

It has appeared that by this measure, a quite considerable extension of the useful service life of a rotor wheel of the kind referred to is obtained.

In the following, the invention will be explained in further detail with reference to the accompanying drawings, in which FIG. 1 shows an atomizer wheel mounted in a spray-drying plant;

Figure 1:
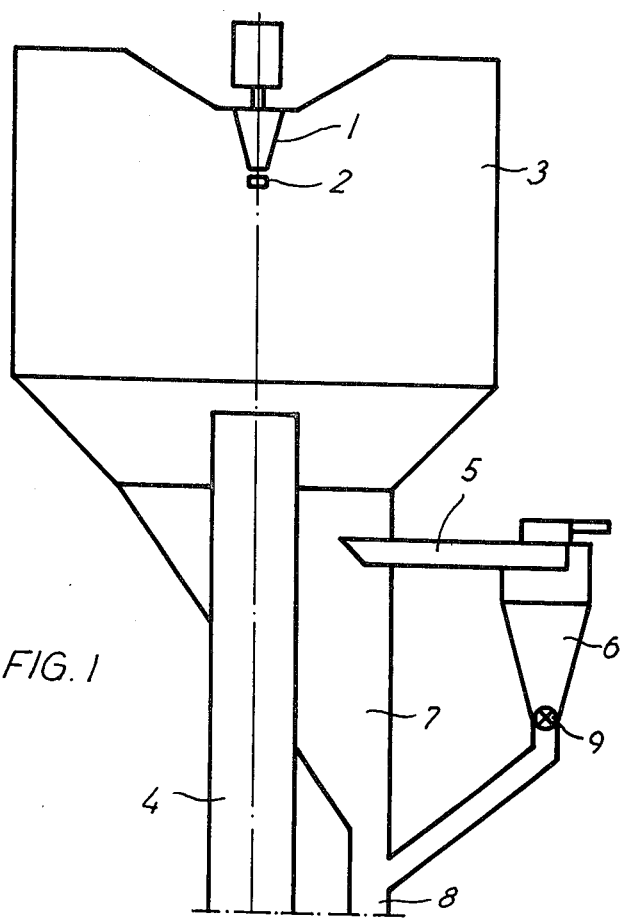

In FIG. 1, a spray-drying plant of the kind disclosed in British Pat. No. 1,406,667 is shown. A slurry of a highly abrasive material is supplied to an atomizing device 1 and atomized by means of an atomizer wheel 2, which is arranged in the upper part of a drying chamber 3, into the bottom of which a drying gas is introduced through a pipe 4. The drying gas escapes from drying chamber 3 through a pipe 5 to a cyclone 6, whereas the spray-dried product is removed through a funnel 7 of the bottom of drying chamber 3 and an outlet pipe 8 connected to the bottom of said funnel, which outlet pipe is also connected through a further pipe to a powder outlet 9 in the bottom of cyclone 6.

During operation of the plant, the atomizer wheel 2 is rotating at a considerable speed, and simultaneously the bottom of the wheel is exposed to heat influence from the drying gas supplied through pipe 4, the temperature of which gas may be as high as 1200°–1400° C. Thereby the bottom of the wheel will deflect at its outer circumference.

In known atomizer wheels of the kind disclosed in the above mentioned U.S. Pat. Nos. 3,454,226 and 3,640,467, this load acting on the wheel bottom will result in that the annular sintered bottom plate which is arranged above the wheel bottom proper in order to resist wearing forces from the disposed material in the bowl-shaped space of the wheel, will be subjected to greater tension stresses than the sintered material will be able to resist, as a result of being firmly clamped between the hub and circumference of the wheel, whereby this plate will show a tendency to crack in radial directions after a relatively short period of operation.

Figure 2:
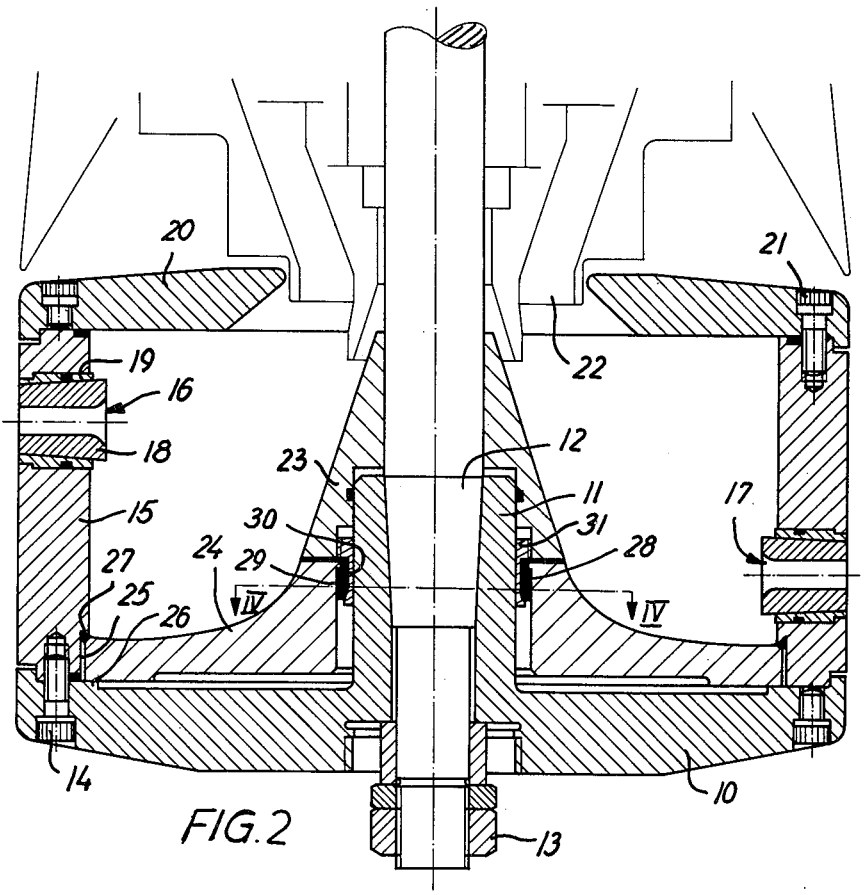
FIGS. 2 and 3 are axial sectional views of a preferred embodiment of the rotor wheel according to the invention in an unloaded condition and a deflected state of the wheel bottom, respectively.

This problem has been solved in the rotor wheel according to the invention, an embodiment of which is shown in FIG. 2. This principal construction of this wheel is known, for example, from U.S. Pat. No. 3,640,467. The mainly flat bottom 10 of the wheel is secured by means of a central hub 11 on a shaft 12, the free end of which projects through wheel bottom 10, a nut 13 being screwed onto said free hub end. By means of screws 14, the wheel bottom 10 is connected along its outer circumference to the cylindrical side wall 15 of the wheel, in which two rows of ejection orifices are formed in the present embodiment, as shown at 16 and 17, said orifices being lined by steel bushings 19, into which bushings 18 of a wear-resistant material, for example a sintered material, are inserted so as to project a distance inside the inner side of side wall 15, as disclosed in the above mentioned U.S. patent. By means of screws 21, the cylindrical side wall 15 is firmly connected with an annular covering plate 20, in the central part of which around the shaft 12, an opening is formed to receive a funnel 22, which is only schematically illustrated and serves as an inlet means for feeding the slurry to be processed in the atomizer wheel.

Around the hub 11, the interior of the wheel forms in known manner an annular bowl-shaped space which is inwardly limited by a body of revolution 23 arranged around the shaft 12 and the upper part of the hub 11, said body being mainly conical in the embodiment shown. Downwardly the bowl-shaped space is limited by as annular plate 24, which in order to be able to resist wearing forces is made of a sintered material, such as aluminium oxide, tungsten carbide or silicon carbide.

Figure 3:
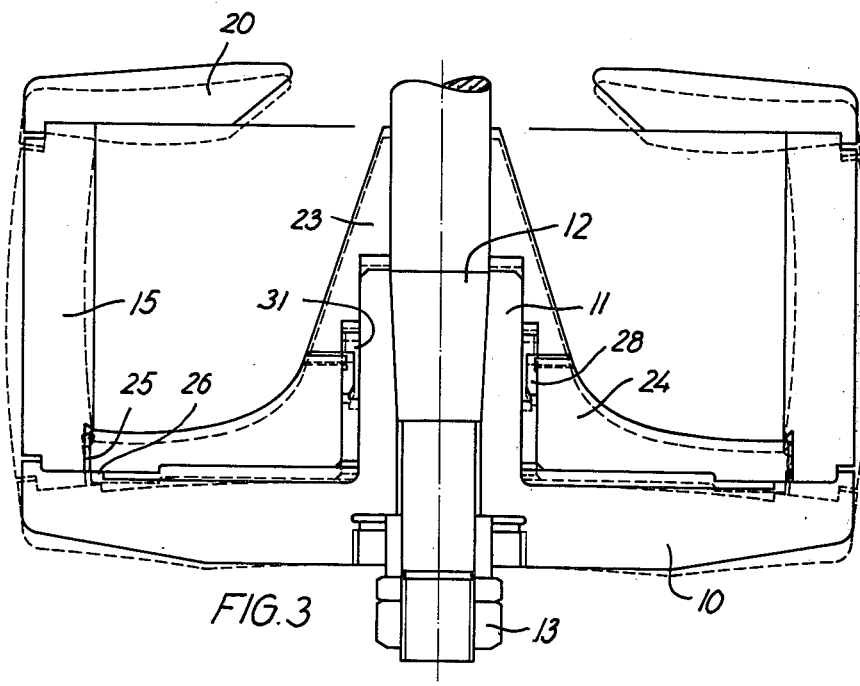

In the embodiment shown in FIG. 2, the annular sintered bottom plate 24 is firmly secured to the side wall of the wheel and arranged to be spaced from the wheel bottom 10, and the conical body of revolution 23, with which the sintered plate 24 is connected in the manner explained in the following, is arranged to be axially displaceable on the hub 11 and the shaft 12. Thereby, the sintered plate 24 will be able to follow the above mentioned deflection of the bottom of the atomizer wheel, as illustrated in FIG. 3, without being subjected to harmful tension stresses, as a result of which the formation of cracks in the sintered plate is avoided.

A further improved resistability of the sintered plate 24 against mechanical stresses may be obtained according to a special aspect of the invention by such a design of said plate that the thickness thereof increases in the direction towards the hub of the wheel. Since the theoretically optimal cross-sectional form would be that of hyperbolic section curves of the upper side as well as the lower side of the sintered plate, a particular advantageous design of the sintered plate may be obtained in practical applications taking into account the mounting conditions, by designing the underside of plate 24 facing the wheel bottom 10 to be substantially flat, whereas the upper side of the plate adjoining the outer surface of the body of revolution is given the form of a hyperboloid, so that plate 24 will form together with conical body 23 a continuous, internal trumpet-shaped limitation wall of the bowl-shaped space.

In the embodiment shown, the sintered plate 24 is firmly secured at the circumference of the wheel by being clamped in a recess 25 which is formed at the lower part of the inner side of the cylindrical side wall 15 of the wheel, the underside of plate 24 being supported by a relatively narrow, annular protrusion 26 from the upper side of wheel bottom 10, and an O-ring 27 being arranged between the upper edge of recess 25 and the sintered plate 24.

Figure 4:
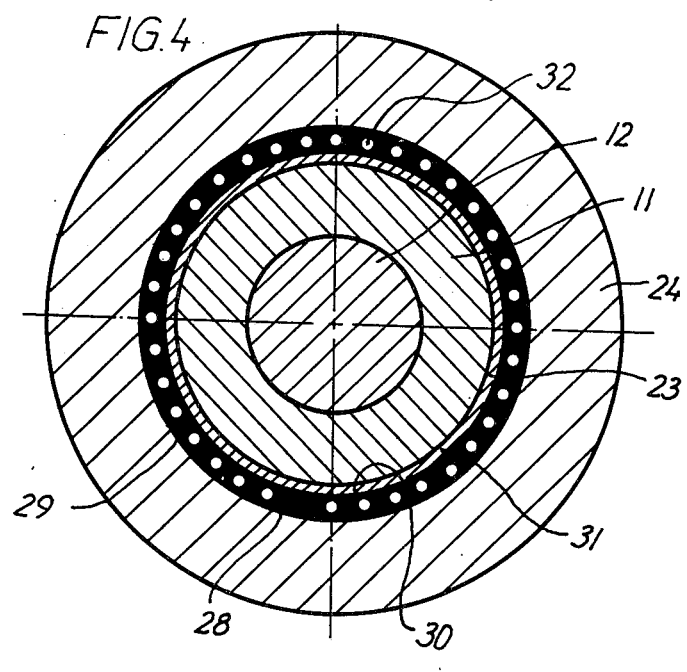
FIG. 4 is a sectional view along the line IV—IV in FIG. 2.

Furthermore, in order to avoid mechanical stresses in the sintered plate 24 caused by thermal expansion of the conical body 23 which is usually made of steel, so that the thermal expansion coefficient thereof will be different from that of the sintered material in plate 24, the connection between the sintered plate 24 and the conical body 23 may consist of a cementation 28 between a cylindrical contact surface 29 formed on the sintered plate 24 coaxial with the hub 11 of the wheel and a contact surface 30 formed on a thread ring 31 arranged around the hub 11 and having an external thread onto which the conical part 23 is firmly screwed. As a result thereof, the conical body 23 may on one hand be easily replaced, so that it may be made of a cheaper material, such as steel, than the sintered parts of the wheel. On the other hand, it may be obtained by providing a number of holes 32 extending in the axial direction of the wheel in said cementation 28, such as shown in FIG. 4, that thermal expansion of the conical body 23 perpendicular to the axis of the wheel will be taken up by the cementation, so that no mechanical stresses will occur in the sintered plate 24 as a result thereof.

Figure 5:
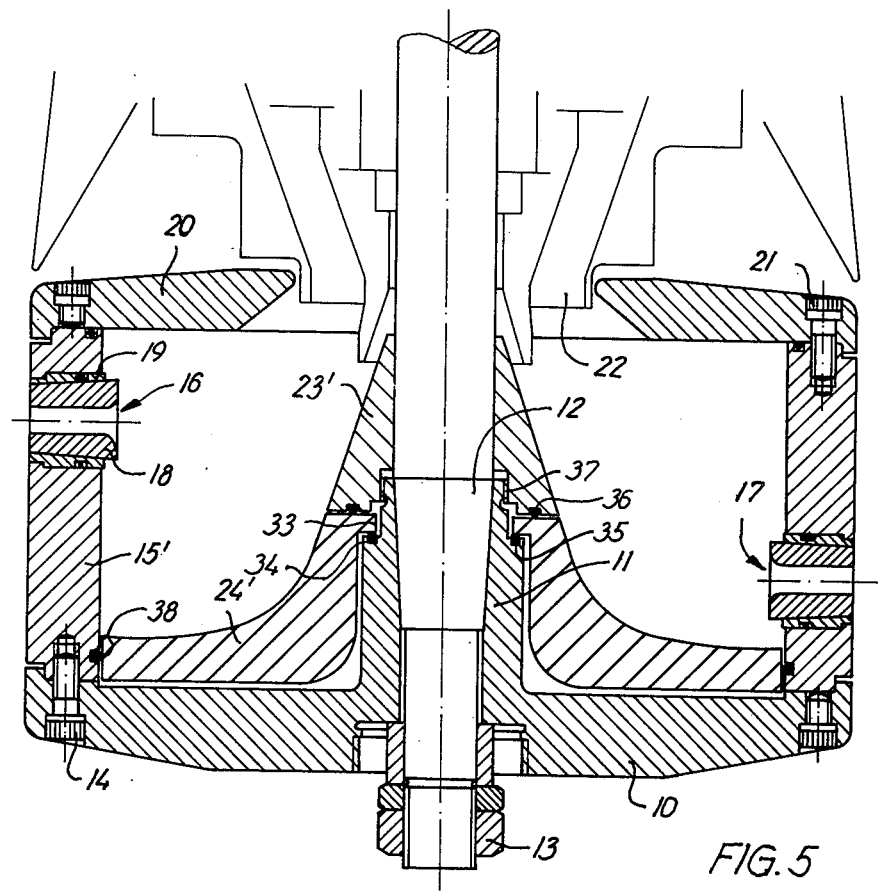
FIG. 5 is an axial sectional view of a further embodiment.

In FIG. 5, in which parts corresponding to those shown in FIG. 2 are designated by identical reference numerals, a further embodiment of a rotor wheel according to the invention is shown. In this embodiment, the annular sintered plate, which is designated by 24', is firmly secured to the hub of the wheel by being formed with an inwardly extending collar 33, the underside of which is supported by a shoulder portion 34 formed on the hub 11 with the interposition of a sealing ring 35, whereas the upper side of said collar forms a supporting surface for the underside of the body of revolution, which in this embodiment is designated by 23' and is screwed directly onto an external thread 37 formed at the upper end of the hub 11, a further sealing ring 36 being interposed between the upper side of collar 33 and the underside of body 23'.

In the embodiment shown in FIG. 5, there is, furthermore, provided an endless groove at the lower part at the inner side of the side wall, which in this case is designated by 15', opposite the outer circumference of the plate 24', in which groove there is inserted a sealing ring 38 which at the same time prevents solid particles contained in the slurry from penetrating into the clearance between the side wall 15' and the plate 24' and allows sufficient relative movement between side wall 15' and plate 24' to secure that the side wall may follow a deflection, as illustrated in FIG. 3, of the wheel bottom 10 without subjecting the sintered plate 24' which is firmly secured to the hub, to deformation forces.

Advantageously, the outer appearance or design of the sintered plate 24' may also in this case be such that the lower side of the plate facing the wheel bottom 10 is substantially flat, whereas the upper side has the form of a hyperboloid, which forms together with the outer surface of the conical body of revolution 23' a continuous internal, trumpet-shaped limitation wall of the bowl-shaped space of the wheel.

What is claimed is:

1. In a wear-resistant rotor wheel, particularly for use as an atomizer wheel for the atomization of slurries of highly abrasive materials or as a rotor wheel for an agitator pump of the centrifugal type, and including a central hub, a wheel bottom fixedly connected with said hub, a body of revolution symmetrically surrounding said hub to form a guide surface for said slurry, an annular plate of a wear-resistant sintered material covering said wheel bottom, a substantially cylindrical side wall formed with a number of ejection orifices, the annular plate having an inner circumference disposed adjacent the central hub and an outer circumference disposed adjacent the cylindrical side wall, a number of wear-resistant bushings individually lining each of said orifices, said body of revolution, said annular plate and the inner side of said side wall defining an annular bowl-shaped space concentric with said hub, and inlet means for feeding a slurry into said bowl-shaped space, the improvements comprising: the annular plate being spaced from said wheel bottom to provide a clearance therebetween, and means for sealing the outer circumference of the annular plate relative to the lower part of the inner side of said side wall to prevent solid particles contained in said slurry from penetrating between said annular plate and said side wall and to simultaneously allow said side wall to follow any operational deflections of said wheel bottom without subjecting said annular plate to deformation forces, one of said inner circumference and said outer circumference of said annular plate being displaceable with respect to the central hub and the cylindrical side wall, respectively, and the other of said inner circumference and said outer circumference of said annular plate being fixed with respect to the central hub and to the cylindrical side wall, respectively.

2. A rotor wheel as claimed in claim 1, wherein said sealing means comprises a recess formed at the lower part of the inner side of said side wall for firmly securing the outer circumference of said annular plate to said side wall, said body of revolution being connected with said annular plate and being arranged to be axially displaceable on said hub.

3. A rotor wheel as claimed in claim 2, wherein said annular plate has an axial thickness increasing in the radial direction towards said hub.

4. A rotor wheel as claimed in claim 3, wherein said annular plate is formed with a flat underside facing said wheel bottom, whereas the upper side of the plate is shaped in form of a hyperboloid.

5. A rotor wheel as claimed in claim 1, wherein said annular plate is firmly secured to said hub, and said sealing means comprises a sealing ring arranged between the outer circumference of said plate and the inner side of said side wall to allow relative movement between said plate and said side wall.

6. A rotor wheel as claimed in claim 5, wherein said annular plate has an axial thickness increasing in the radial direction towards said hub.

7. A rotor wheel as claimed in claim 6, wherein said annular plate is formed with a flat underside facing said wheel bottom, whereas the upper side of the plate is shaped in form of a hyperboloid.

* * * * *